Aug. 29, 1972    KARL-HEINZ STEIGERWALD    3,687,716
METHOD AND APPARATUS FOR ELECTRON BEAM TREATMENT
OF SURFACE LAYERS Filed Nov. 12, 1969    3 Sheets-Sheet 1

INVENTOR:
KARL-HEINZ STEIGERWALD

United States Patent Office

3,687,716
Patented Aug. 29, 1972

3,687,716
METHOD AND APPARATUS FOR ELECTRON BEAM TREATMENT OF SURFACE LAYERS
Karl-Heinz Steigerwald, 1a Haderunstrasse,
8 Munich 55, Germany
Filed Nov. 12, 1969, Ser. No. 875,670
Claims priority, application Germany, Nov. 13, 1968,
P 18 08 719.5
Int. Cl. B44d 1/50
U.S. Cl. 117—93.1 GD            39 Claims

ABSTRACT OF THE DISCLOSURE

A method of treatment of surface layers, more particularly for setting varnish layers, of articles by irradiation with charge carrier beams, more particularly electron beams, in which the article is inserted in a working chamber maintained at reduced pressure and a charge carrier beam generating from a beam source is conducted only through free apertures into the working chamber and there on the surface layer to be treated, characterised by the feature that the beam is conducted successively through a plurality of independently controllable deflecting fields spread at least over part of a circumference of the article and by these conducted over predetermined circumferential regions of the article, and that the deflecting fields, and, if required, also the beam parameters of the beam, are controlled in dependence upon the form of the surface to be treated and in accordance with the absorption of beam energy required in the momentarily irradiated region of the surface layer.

Apparatus for the treatment of surface layers of articles by irradiation with charge carrier beams, comprising an evacuatable working chamber for receiving the article, a beam generating system which is provided with a beam control device for optionally controlling the beam parameters and is connected with the working chamber via an irradiation path extending only through exposed apertures, and a deflecting device for producing a controllable deflecting field in the entry region of the working chamber where a beam produced in the beam generating system enters the working chamber, characterised by the feature that at least one further deflecting device is arranged in the neighbourhood of the deflecting device so that the beam on leaving the first deflecting device is conducted through the further deflecting device where it may be further deflected, and that for controlling the deflecting devices, a deflection control device is provided which is controlled from a main control device in dependence upon the shape of the surface to be treated, preferably according to a programme, so that according to the irradiation requirements to be fulfilled in an article there is a predetermined connection between the adjustment of the deflection control device and the irradiation conditions required at this point.

The method according to the invention is of the type wherein the article is introduced into a working chamber which is held at reduced pressure, and a charge carrier beam emitted from a beam source is passed into the working chamber and onto the surface layer to be treated through free openings only.

In contrast to other methods wherein the charge carrier beam is passed through a window which is as readily as possible permeable to the beam, this method has the advantage that lower particle velocities may be used and that scattering of the beam by a window material or by an atmosphere surrounding the article is substantially avoided. Low particle velocities are favourable because the costs for the beam generator depend largely upon the particle acceleration required and because the permeability is lower. Hence, in thin layers, such as varnish layers, a considerable proportion of beam energy can be absorbed and the output used for the beam generation can thus be better utilised. On the other hand, of course, it is necessary in the method referred to, to provide an evacuatable working chamber and pumping devices for evacuating the working chamber. With present day state of vacuum technique this does not provide any technical difficulties yet implies a noticeable increase of apparatus expenditure, so that in practice it was generally preferred for the beam generator and the working chamber, which in most cases was maintained under normal atmospheric pressure, to be separated by a window as perfectly permeable to beams as possible, so that the beam generator with little expenditure could be evacuated to the required very low pressures. Owing to the unavoidable beam absorption in the window which, for example, can be made of thin aluminium, it was necessary to use very high acceleration voltages and particle velocities, so that the relatively high structural expenditure necessary therefore partly again cancelled the cost advantage which was obtained by dispensing with an evacuated working chamber. Moreover, the utilisation of the irradiation during treatment of relatively thin layers, such as layers of varnish, was only slight, since fast particles have a high penetration ability. However, with practically usable distances between the window and the article to be irradiated, the absorption losses and the undesired diffusion in the atmosphere surrounding the article were already considerably disturbing even at high particle velocities.

In known methods and apparatus for the treatment of surface layers, thus both in methods of the kind referred to (with open connection between beam generator and evacuated working chamber) and in the kind last described with beam permeable windows and high particle velocities, it has hitherto been possible only to treat very simple surface forms, such as those occurring in strips, plates or foils. In connection with the last-described method having high particle velocities, it has already been proposed to treat complicated surface forms such as occurring e.g. in pipes and the like, in such a manner that either several beam sources are used or beam permeable windows and the anode in which this window is normally contained, are adapted to the surface form of the articles to be treated. The last-mentioned proposal clearly shows that in the known methods a slight clearance between window and article is of decisive importance to keep absorption and diffusion low in the atmosphere enclosing the article. These proposed measures are, however, fundamentally unsatisfactory since they are apparently only applicable with relatively simple surface forms and, when changing between articles of varying surface forms, necessitate corresponding structural modifications.

The invention is based on the object of providing a method of treatment of surface layers, more particularly of setting varnish layers, which is applicable for articles of optional and even complex surface forms without structural modifications.

According to the invention a method of treatment of surface layers, more particularly for setting varnish layers, of articles by irradiation with charge carrier beams, more particularly electron beams in which the article is inserted in a working chamber maintained at reduced pressure and a charge carrier beam generating from a beam source is conducted only through free apertures into the working chamber and there onto the surface layer to be treated, is characterised by the feature that the beam is conducted successively through a plurality of independent controllable deflecting fields spread at least over part of a circumference of the article and by these conducted over predetermined circumferential regions of the article, and that the deflecting fields, and, if required, also the beam parameters of the beam, are controlled in dependence upon the form of the surface to be treated and in accordance with the absorption of beam energy required in the momentarily irradiated region of the surface layer.

In the method of the invention the same advantages are obtained which were also obtained in prior methods utilizing an evacuated working chamber and free passage openings for the beam, but, hitherto, relative to the increased expenditure for the evacuation, were insufficient to ensure that the method referred to was spread in practice. However, the method according to the present invention offers additional decisive advantages with respect to the treatment of optionally shaped surfaces and accurate proportioning of the irradiation, and thus is, despite the necessity of using an evacuated working chamber, without doubt superior to the methods most frequently found in practice having beams of a high particle velocity and beam-permeable windows.

In the method in accordance with the invention, the beam may be conducted by the deflecting fields acting successively thereon in, if necessary, complicated paths against any desired point of the surface to be treated; the relatively long beam paths often necessary being acceptable owing to the low pressure prevailing in the working chamber, and consequently being without excessive losses of beam energy. The control of the deflecting fields and possibly also the beam parameters in dependence upon the form of the surface to be treated and the required absorption of beam energy ensures that the beam reaches all points of the predetermined external surface region and always supplies the correct quantity of beam energy to the surface areas therein. The method in accordance with the invention is hence distinguished by an extremely great versatility and is universally applicable. Because of the use of free passage openings for the beam and of the working chamber being under relatively low pressure, relatively low particle velocities may be used, in electron beams, for example, particle velocities below 100 kev. Therefore, the required deflections may be obtained with deflecting fields of relatively low strength, and good utilisation of beam energy is obtained also when irradiating relatively thin surface layers. Moreover, the intensity of the X-ray radiation occurring upon impingement of the beam on the article is relatively low. Because of the vacuum applied in the working chamber, undesired phenomenae such as secondary radiation, diffusion and defocusing caused by the interaction with gas molecules are reduced to such an extent that they no longer interfere in practice. To summarize, the method in accordance with the invention is hence distinguished by its considerable versatility and a completely controllable and definite irradiation situation. In the penetrating irradiation of thick articles with fast electrons, it has already been proposed to improve the results by splitting the electron beam into two components and directing one component directly onto one side of the article, whilst the other component is deflected by a deflecting field through 180° and directed onto the opposite side of the article. However, the possibility of treating the articles of optional surface by using a plurality of independently controllable deflecting fields acting successively on a beam in an optional adaptable manner has not been thought of in connection with this known method. Rather, in the known method, a beam of fast electrons is projected through a window into a working chamber at a relatively high gas pressure, is only weakly focused and has a relatively large cross-section which encloses the whole surface of the article to be treated. Moreover, due to the high electron velocity, a relatively strong deflecting field is required and the increased length of beam path necessary for the deflection, necessarily leads to relatively high losses by absorption and diffusion in the gas atmosphere since a working chamber subject to reduced pressure is not used. Therefore, this known method could not succeed in practice.

Deflection of corpuscular beams with the aid of deflecting fields is of course known per se. Further, when treating surface layers of articles with high-speed electrons it is already known to conduct the beam by a deflecting field linearly over a substantially flat surface to be treated. This corresponds in the electron beam technique to the generally known linear scanning. In this connection it is also known to vary the beam intensity during the deflecting operation so that the reduction of the irradiation density corresponding to the cosine of the angle of impact is compensated. Also in this case, however, there is no mention of passing the beam successively through a plurality of independently controllable deflecting fields and thereby conducting the beam to all points of a predetermined circumferential region of an article of optionally formed surface.

In the method in accordance with the invention controllable magnetic fields are preferably used as deflection fields.

In a further development of the method in accordance with the invention, the beam may be deflected additionally at right angles to the circumferential direction of the article. A particularly simple method of operation in accordance with the invention is characterised by the feature that within coherent circumferential regions of the article the beam is continued in circumferential or peripheral direction by changing only one of the deflecting fields.

The timed variations of the deflecting fields are preferably controlled in dependence upon the angle of incidence with which the beam impacts the surface layer, and/or in dependence of the position of the irradiated region on the article such that the substance forming the surface layer absorbs a predetermined, preferably constant quantity of energy from the beam per unit quantity. It could, however, also be advantageous for the beam parameters to be controlled in dependence upon the angle of incidence at which the beam impacts the surface layer and/or in dependence upon the position of the irradiated region so that per unit quantity of the surface layer to be treated a predetermined, preferably constant quantity of energy is absorbed from the beam.

A particularly favourable feature is if, in further development of the method in accordance with the invention, the beam parameters determining the penetrating ability of the beam are so controlled that a required distribution of the energy absorption from the beam results over the depth of surface layer to be treated. In this manner, for example, when setting a layer of varnish, it is possible to effect hardening of the varnish layer so as to increase outwardly from the inside, so that both a hard and resistant varnish surface and a required residual elasticity of the varnish layer is obtained. A similar result may be obtained in accordance with the invention in that two beam components are used having different velocities; the velocities and the current intensities of the components being so chosen that the irradiated surface layer in a first region of depth, preferably close to its exposed surface, absorbs more beam energy than in other regions of depth. The two beam components may be produced in timed succession with advantage by periodically controlling the beam parameters of a single beam source, the deflecting fields being adapted to the latter synchronously with the control of the beam parameters.

Because of the omission of material windows in the beam path electrons preferably from the velocity region of up to 100 keV are usable in accordance with the invention.

Frequently, especially when applying coats of varnish, it is particularly favourable to apply the surface layer to the article in the working chamber.

Since in the method of operation described on which the invention is based, the article is inserted in a working chamber subjected to a reduced pressure, for the treatment of the surface layers applied to the article, the latter may preferably be inserted in the working chamber before applying the surface layer where it is then subjected to a preparatory surface treatment which requires a reduced pressure atmosphere. This feature offers a favourable possibility particularly in connection with the method of operation in accordance with the invention already described and constitutes an important advantage additionally obtained without further expenditure.

The preparatory surface treatment may at least partly consists of a known surface cleansing by glow discharge. A reduced surrounding pressure is a condition for such a surface cleaning. The preparatory surface treatment may at least partly consist of a surface cleansing by irradiation with a charge carrier beam, more especially an electron beam. For this too a reduced environment pressure is an advantage. Advantageously, the article inserted in the working chamber in a first pass is moved past the beam source and is cleaned by irradiation with a beam, a surface layer to be treated is then applied in a second pass and the article then moved past the beam source and is irradiated for the purpose of treatment of the surface layer. A particularly simple mode of operation is obtained when the beam effecting the cleaning is extracted from the same beam source as that used for layer treatment and by the same independently controllable deflecting fields is guided successively over predetermined regions of the surface of the article, whereby during cleaning the deflecting fields and, if required, also the beam parameters of the beam, are adjusted to the required cleaning action in dependence upon the form of the surface to be cleaned and in accordance with the given region of the surface irradiated.

In an embodiment of the method in accordance with the invention, it is advantageous for the beam to be controlled impulse-like. Thus, e.g. by using suitable impulse forms, it is also possible to attain a required distribution of the beam absorption over the depth of surface layer to be treated.

An evidently advantageous embodiment of the method in accordance with the invention is characterised by the feature that the surface of the article is scanned by the beam by a movement in one co-ordinate direction of the article relative to the beam source and in another co-ordinate direction by deflection of the beam.

An often favourable large area irradiation may be attained in a further development of the invention by periodically reciprocating the beam during its further drifting over the surface. Large area irradiation may also be obtained by widening the beam before impinging the surface. It is often found expedient to keep the beam diameter at the point of incidence in the order of magnitude of one centimetre.

To obtain a high treatment velocity particularly with large articles it may be expedient to cause a plurality of beams to act alternately or successively on the surface of the article. Thus, for example, different portions of the surface may be treated simultaneously by a plurality of beams.

Also according to the invention, an apparatus for carrying out the method of the invention for the treatment of surface layers, more particularly for setting varnish layers on articles by irradiation with charge carrier beams, more especially electron beams, having an evacuatable working chamber to receive the article, a beam generating system which is provided with a beam control device for optionally controlling the beam parameters and which is connected with the working chamber via an irradiation path extending only through exposed openings, and a deflecting device for producing a controllable deflecting field provided in the inlet region of the working chamber where a beam produced in the beam generating system enters the working chamber. This apparatus is characterised by the feature that at least a further deflecting device is arranged in the vicinity of the deflecting device so that the beam on leaving the first deflecting device is conducted through a further deflecting device and from there can be further deflected, and that a deflecting control device is provided for controlling the deflecting device, which control device is controllable from a main control device in dependence upon the form of surface to be treated, preferably according to a programme so that, depending upon the irradiation requirements to be fulfilled, a predetermined connection exists between the adjustment of the deflecting control device determining the irradiation point and the irradiation conditions required at this point.

In this manner the apparatus in accordance with the invention enables complex surface regions to be subjected to predetermined dosages of irradiation at all points. The invention is especially suitable for the treatment of series produced articles. The control of the deflecting devices, i.e. the deflecting fields and, if required, also the beam parameters, even in coated articles with complex forms, may be established in a programme with any required accuracy in accordance with the shape of the article; said programme operating in same manner for the treatment of all identically shaped articles. The single working effort for preparing the programme in such series method of operation does not play an important part.

The apparatus in accordance with the invention is preferably further characterised by the feature that the beam control device of the main control device is controllable in synchronism with the deflcting device according to a programme which, in dependence upon the irradiation requirements to be fulfilled in an article, predetermines a certain connection between the definite adjustment of the deflecting device and the beam data required at this point.

In the apparatus in accordance with the invention, a plurality of deflecting devices are preferably spread around at least a part of the circumference of the article.

It is moreover advantageous that each of the deflecting devices is adapted to deflect the beam in a plane, and especially all deflecting devices are preferably adapted to produce deflections which are all lying in a common plane. In this embodiment the beam impacts the article to be treated always in one and the same plane, so that particularly clear conditions result and the article can be swept completely by the beam by movement vertically to the plane. Moreover, this feature is particularly advantageous in a further configuration of the apparatus in accordance with the invention, which is characterised in that the working chamber is divided by a partition which is provided with a narrow slot for the passage of the beam into a deflecting chamber containing the deflecting device and an irradiation chamber containing the article, both chambers being individually evacuatable and form a pressure stage system. Such a pressure stage system facilitates evacuation and the removal of products possibly arising during treatment.

In the apparatus in accordance with the invention deflecting devices are preferably used which operate with controllable magnetic fields.

To produce an additional deflection of the beam directed preferably at right angles to the deflection caused by the deflecting fields, at least one additional deflecting device may preferably be provided. This is easily realised by dividing the working chamber by means of a partition which has a narrow slot for the passage of the beam, and by providing control elements for an electrostatic or magnetic additional deflecting device on both sides of the slot.

A defocusing device may be provided between the deflecting field and the coated surface to be irradiated to increase the area irradiated. When using a working chamber divided in the manner described, such a defocusing device may be formed simply by a defocusing magnet extending along the slot of the partition.

An embodiment of the apparatus in accordance with the invention which may be particularly preferable for treating relatively large articles, may be provided by the location of a plurality of beam control systems around a circumference of the working chamber.

In further development of the invention it is preferable to provide feed devices for the controlled progressive movement of the article through the working chamber. These feed devices are preferably synchronized with the deflecting control device, so that a fully automatic working cycle may be obtained.

In further development of the invention a device for applying a surface layer to be treated on the article may be provided in the working chamber.

Furthermore in further development of the invention a device for the preparatory surface cleaning of articles charged may be provided in the working chamber.

The invention will be described further, by way of example, with reference to the accompanying drawings, in which.

Figure 1:
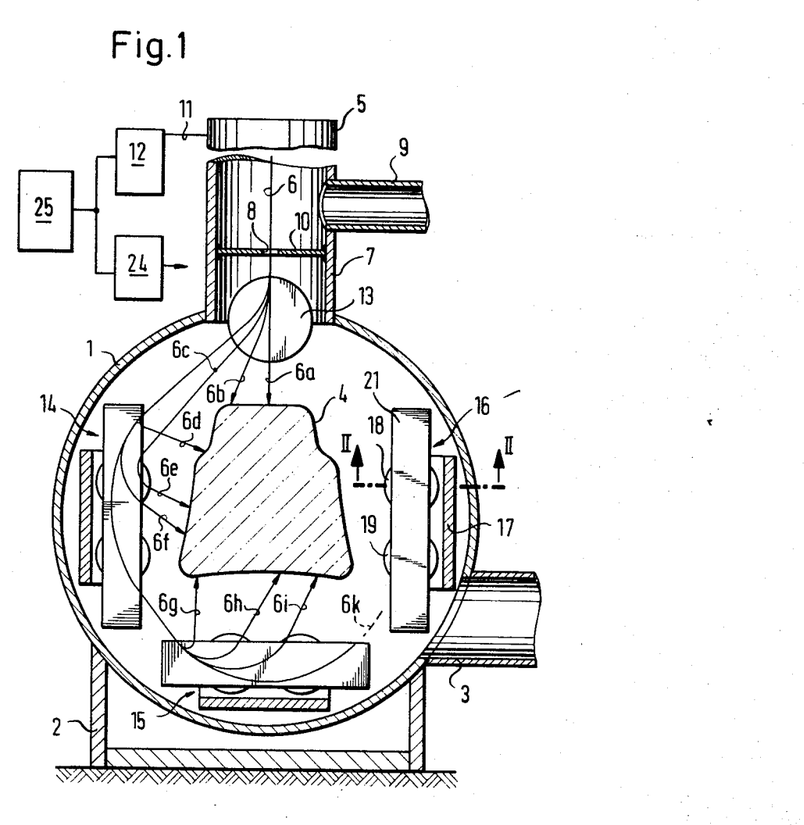
FIG. 1 is a schematic cross-section through an apparatus for surface treatment.

The apparatus shown in FIG. 1 comprises a working chamber 1, which rests on a frame 2 and may be evacuated via a pump socket 3. The working chamber is substantially in shape of a horizontally arranged cylinder and FIG. 1 is a radial section substantially through the centre of the cylinder. The working chamber is hermetically sealed at both ends by means of devices (not shown), which may, for example, also contain a vacuum seal of known type. The article 4, the surface of which is to be treated, is inserted in the working chamber 1. FIG. 1 does not show the devices for holding and progressively displacing the article 4.

A charge carrier beam, such as an electron beam 6, enters the working chamber 1 from a schematically indicated beam generating system. The lower part of the beam generator 5 constitutes a coupling member 7 connected to the working chamber 1. The electron beam enters the working chamber 1 only through exposed openings, such as the fine diaphragm aperture 8 shown in FIG. 1. A further pump socket 9 is provided above the diaphragm aperture 8 and serves the evacuation of the beam generator 5. The diaphragm 10 in which the diaphragm aperture 8 is located hence forms a part of a pressure step system. Further diaphragms and pump sockets may, of course, also be provided in known manner.

The beam generator 5 is controlled by a beam control device 12 via control lines 11 shown schematically. This device, for example, determines the beam current and the acceleration voltage of the charge carrier beam.

The entry region of the working chamber 1 where the charge carrier beam 6 produced in the beam generating system enters the working chamber, is provided with a magnetic deflecting device 13 which produces a controllable magnetic field extending at right angles to the drawing plane of FIG. 1. Furthermore, further controllable magnetic deflecting devices 14, 15 and 16 are spread around the circumference of the article 4 when located in the working chamber 1. These deflecting devices also produce magnetic fields, the force lines of which extend at right angles to the plane of FIG. 1.

Figure 2:
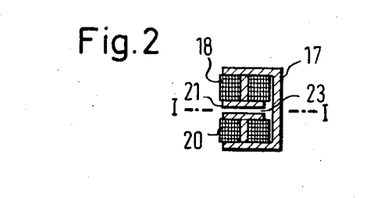
FIG. 2 is a schematic sectional view taken on the line II—II of FIG. 1.

The structure of one of the further deflecting devices, namely the deflecting device 16, is shown more clearly in FIG. 2; the deflecting devices 14 and 15 being similarly fashioned. The deflecting device 16 consists of a first pole piece 17 of magnetizable material in form of an elongated U-section. On the inside surfaces of the shanks of the U-section four exciter windings in all are located, of which, in FIG. 1 only the windings 18 and 19 and in FIG. 2 only the windings 18 and 20 are shown. Each exciter winding has a core and a pole piece mounted thereon in the form of an elongated plate. Since the section shown in FIG. 1 extends through the plane denoted by I—I in FIG. 2, FIG. 1 only shows one of the two pole pieces, in the deflecting device 16 shown in more detail thus the pole piece 21. The means for securing the deflecting devices and for connecting the exciter windings are not shown. The exciter windings are so poled that a substantially homogeneous magnetic field is built up between the second pole pieces 21 and 22. In the apparatus shown the flat gap 23 between the two pole pieces 21 and 22 of all deflecting devices are located on one plane, so that a charge carrier beam extending in this plane is deflected in this plane by the deflecting devices.

All deflecting devices are connected to a deflecting control device 24 in a manner not further shown. The beam control device 12 and the deflecting control device 24 are both connected to a main control device 25 and controlled synchronously thereby, for example, in dependence upon a fixed programme adjustable in the main control device 25. Some settings of the electron beam 6 are indicated in FIG. 1, as they may successively pass through during the action of a programme adapted to the surface form of the article 4. With a non-energised deflecting device 13 (which is constructed similarly to the further deflecting devices 14, 15, 16), the beam course 6a results. By low excitation of the deflecting device 13 the beam may be deflected to the left (or with reversed polarity of the deflecting field to the right), for example, to the position 6b; thereby a suitable corresponding circumferential region of the article 4 is swept by the beam. Since the excitation of the deflecting device 13 via the deflecting control device 24 is adjusted from the main control device 25 synchronous with possible variations of the beam control device 12 according to the programme adapted for the article, at every point of the surface to be treated of the article 4, the given required irradiation intensity and duration is obtained.

With more powerful excitation of the deflecting device 13 the beam may finally assume a position 6c in which, with the aid of the suitably excited further deflecting device 14, it can again be diverted to the surface of the article 4. However, a method of operation is preferred in which the beam is deflected further into the position 6d by the deflecting device 13, in which position the beam enters in the upper end region of the further deflecting device 14. Running the further course of the irradiation the excitation of the deflecting device 13 is kept constant, and at first only the excitation of the deflecting device is changed, thus in such a manner that the beam conditions 6e, 6f and 6g picked out as example are traversed. Thus, when the left-hand circumferential region of the article 4 in FIG. 1 is irradiated, the deflecting data (such as deflecting speed) and possibly also the beam data are controlled by means of the deflecting device 24 synchronously controlled by the main control device 25 or beam control device 12 so that at each point of the traversed/swept surface region the required irradiation data results. In position 6g the beam passes over into the next deflecting device 15. It is shown that the excitation of the deflecting device 14 may also be kept constant and the progressive conduction of the beam caused over the lower circumferential region of the article 4 in FIG. 1 solely by varying the excitation of the deflecting device 15. Thus, the beam positions 6h and 6i may be successively traversed. It would be quite possible for the beam to be progressively conducted substantially into position 6k and thus into the next deflecting device 16, but it will generally be preferred to sweep the beam over the right-hand half of the periphery of the article 4 in FIG. 1. However it is preferable for the deflecting device 13 to be operated with opposite polarity and the beam consequently progressively conducted from the deflecting device 13 into the deflecting device 16 and then into the deflecting device 15.

After a complete rotation of the beam over the circumference of the article 4, the latter is progressively conveyed in a direction right angles to the plane of FIG. 1; this movement may, of course, be continuous, thus resulting in a spiral-like scanning of the surface of the article 4. The surface of the article is thus treated in a co-ordinate direction by the movement of the article relative to the beam source and in the other co-ordinate direction by deflecting the beam. The devices for advancing the article 4 through the working chamber are not shown. These devices are preferably also subjected to the influence of the main control device 25, so that a required synchronization with the control operations results which are caused by the beam control device 12 and the deflecting control device 24.

When irradiating with an electron beam acceleration voltages up to 100 kev. are preferably used; such acceleration voltages may be used in relatively compact beam generators and present the advantages described above. The penetration ability of the electron beam, as known, depends upon the acceleration voltage. Consequently, by suitable control of the beam current intensity (or deflecting speed) and of the acceleration voltage, it is possible to achieve impact of any desired point of the surface to be treated by predetermined electron current at a predetermined speed. Thus, for example, it is readily possible that a predetermined, preferably constant quantity of energy from the beam is absorbed per unit quantity of the substance forming the surface layer. The influence of the angle of incidence on the current intensity of the irradiation may, of course, be taken into account. Depending upon whether a uniform irradiation at various depths of the surface layer is required or an irradiation effect variable with the depth, the acceleration voltage, i.e. the penetrating ability of the irradiation may be controlled accordingly. In many cases it is preferable to control the beam impulse-like, only during a proportion of the overall action period per surface element a relatively high acceleration voltage being used, so that the irradiation effect is concentrated in the outermost surface layer. In this manner varnish layers for example, may receive a relatively hard outer surface, whilst the compound of the varnish layer still remains slightly resilient. This operation may also be so conceived or carried out that two or more beam components are used at various speeds.

Figure 3:
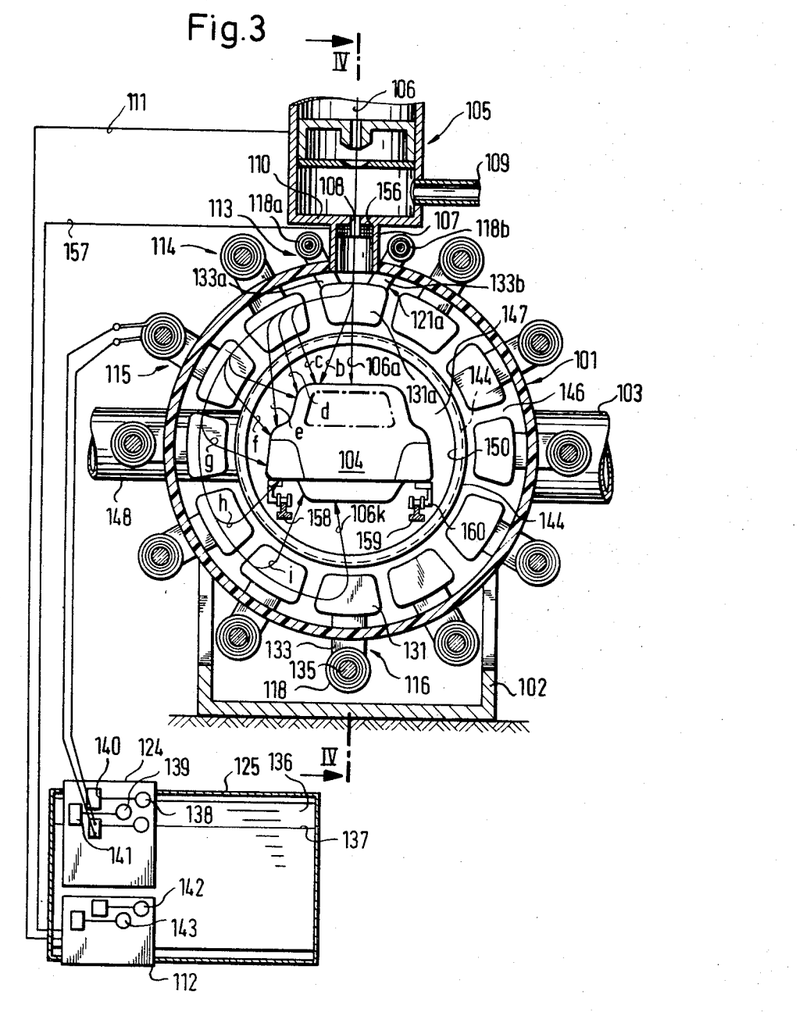
FIG. 3 is a schematic cross-section of an alternative embodiment of the invention and is a section taken on the line III—III of FIG. 4.
Figure 4:
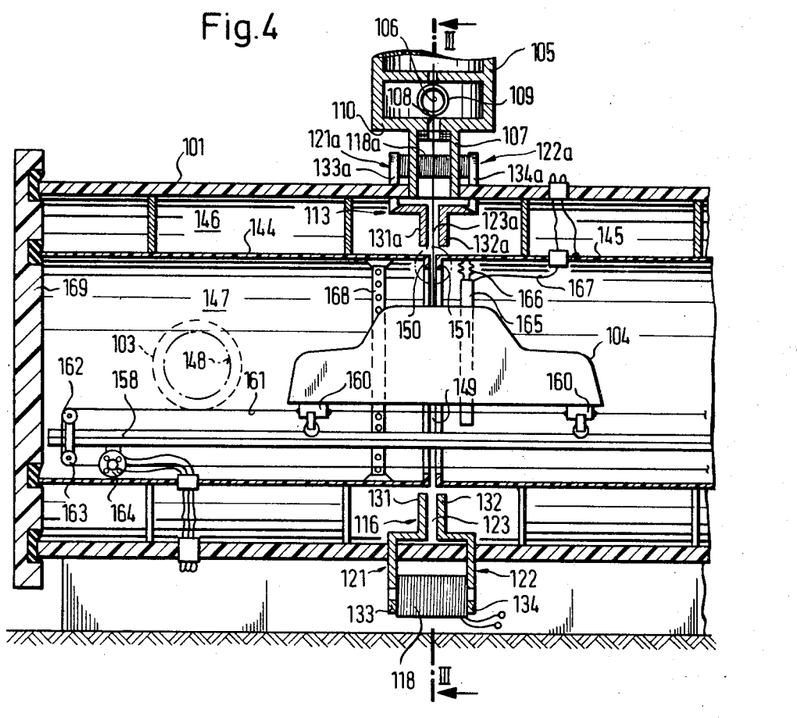
FIG. 4 is a longitudinal schematic section through the apparatus shown in FIG. 3 taken on the line IV—IV of FIG. 3.

The apparatus shown schematically in FIGS. 3 and 4 substantially differs from the apparatus shown in FIG. 1 since, besides the deflecting device located in the beam entry region, eleven further deflecting devices in all are spread around the circumference of the article to be treated.

The apparatus shown in FIGS. 3 and 4 again comprises a cylindrical horizontally located working chamber 101 which rests on a frame 102 and is adapted to be evacuated via a pipe socket 103. In the interior of the chamber an article 104 is indicated, the surface of which is to be treated. A beam generating system 105 again is located in the centre above the working chamber 101 and produces an electron beam 106 which, through a coupling member 107 emanating from a diaphragm aperture 108 of the beam generating system 105, enters the entry region of the working chamber 101. The part of the beam generating system located above the diaphragm aperture 108 may be evacuated via a second pump socket 109, so that a pressure stage system is provided because of the action of the diaphragm 110 in which the diaphragm aperture 108 is located. The beam generating system 105 is connected to the beam control device 112 via control pipes 111. In the entry region of the electron beam 106 an electro-magnetic deflecting device 113 is provided which produces a controllable magnetic field extending at right angles to the plane of the drawing of FIG. 3.

A number of further deflecting devices are spread around the periphery of the article 104 and total eleven in all of which only the first and second further deflecting devices 114 and 115 directly adjacent to the first deflecting device 113 and the sixth further deflecting device 116 are mentioned in detail. Each of the further deflecting devices contains two pole pieces 121, 122 (shown by way of example in FIG. 4 with reference to deflecting device 16) which in one of their extended end sections 131, 132 and at their radiused edges are closer together than at their other narrower end sections 133, 134 which are located further apart and interconnected by a core 135, on which the exciter winding 118 is located. Gaps 123 formed between the closely located end sections 131 and 132 of all deflecting devices are mutually located on the radial plane at which the electron beam 106 enters the working chamber 101. The exciter windings 118 are fed from a deflecting control device 124, which in turn is controlled by a main control device 125. The main control device 125 simultaneously also controls a beam control device 112, which in turn is controlled via control lines 111 of the electron beam generating system 105 indicated only schematically.

The structure of the deflecting device 113 for spatial reasons deviates somewhat from the structure of the further deflecting devices. As shown in FIGS. 3 and 4, two angled pole pieces 121a, 122a are provided which at their enlarged end sections 131a, 132a and radiused edges are close together and form a gap 123a for the passage of the electron beam 106, whilst the other end sections are further apart. These other end sections are branched into two sections which pass through the wall of the working chamber 101 on both sides of the coupling members 107. In FIG. 3 the ramifications 133a and 133b of the pole pieces 121a are shown (whilst in FIG. 4 one of the ramifications 133a or 134a of both pole pieces 121a or 122a are shown. Instead of a single exciter winding, as in the further deflecting devices, two exciter windings 118a and 118b are provided in the deflecting device 113. The function of the deflecting device 113 is incidentally the same as in the further deflecting devices.

The deflection of the electron beam in the apparatus as shown in FIGS. 3 and 4 takes place fundamentally in the same manner as in the apparatus shown in FIG. 1. A plurality of beam paths or positions 106a to 106k, are shown in FIG. 3 which are successively traversed by the beam. In position 106a the deflecting device 113 is shut off. In the deflecting position 106b the deflecting device 113 alone is active. In the position 106c the deflecting device 113 is adjusted to a powerful deflecting value so that the beam is transferred from the deflecting device 113 to the next following deflecting device 114, which is adjusted to a relatively powerful deflecting value, so that the beam continues processing in conjunction with the processing point. By progressive diminishing of the deflecting field produced by the deflecting device 114, the beam positions 106d and 106e are traversed and then, with the lesser deflection remaining constant, the beam is transferred into the next further deflecting device 115 where it at first deflected relatively strongly (position 106f) and then progressively diminshed until passing into the next following deflecting device etc., for each device. Herein also it is possible, in sections, to control only the deflecting action of a deflecting device, whilst the action of the remaining deflecting devices is kept constant. The use of a large number of deflecting devices, in accordance with the view of FIG. 3, presents the advantage that the space available in the working chamber can be better utilised. A disadvantage, however, is that the control becomes more complex and inhomogeneities occur at the edges of the deflecting fields produced at the individual deflecting devices, which inhomogeneities may lead to strong defocusing. In many cases a compromise will be expedient, whereby pole pieces for example in the form of annular disc sectors may be used. FIG. 3 shows in detail a possible mode of operation of the control devices. The main control device 125 contains as essential component a tape-like information carrier 136, for example, a magnetic tape, which on several tracks contains separate information for the individual deflecting devices and the beam parameters. In FIG. 3 only one track 137 is denoted in detail. The information carrier 136 is driven by a driving device (not shown) at a predetermined speed and the drive may also be synchronised with a feed movement of the article 106 through the working chamber 101. The deflecting control device 124 contains for each deflecting device 113, 114, . . . a reading head 138, 139 . . ., each of which reads the associated track of the information carrier 136, and an amplifier unit 140, 141, . . ., which determines the exciter current of the exciter winding of the associated deflecting devices 113, 114, . . . The beam control device 112 also contains reading heads 142, 143, . . ., which read control informations for the individual beam parameters from the corresponding tracks of the information carrier 136 and accordingly control them via amplifiers of the beam generating system 105. In this or the like manner, optional fixedly predetermined connections between the parameters decisive for the movement and action of the beam may be caused to act in simple manner according to a fixed programme.

In the apparatus shown in FIGS. 3 and 4, the exciter windings are located outside the working chamber 101. The working chamber has to be made of non-magnetisable or only slightly magnetisable material. A construction similar to that shown in FIG. 1 may be used instead, in which the entire deflecting devices including their exciter windings are located within the working chamber.

In the apparatus shown in FIGS. 3 and 4, the working chamber 101 is divided by a cylindrical partition comprising two sections 144, 145 into an annular deflecting chamber 146 containing the deflecting devices and an irradiation chamber 147 containing the article. The irradiation chamber 147 is evacuatable via its own pump socket 148, so that the two chambers form a pressure stage system. A slot 149 for the passage of the electron beam 106 is left free in the irradiation chamber 147 between the adjacent edges of the cylinder sections 144 and 145. This slot 149 is located on the same plane as the gaps 123, 123a formed between the pole pieces of the deflecting devices. The opposite edges of the cylinder sections 144 and 145 are provided with inwardly bent over flange sections 150, 151 which increase the flow resistance between the irradiation chamber 147 and the deflecting chamber 146 as required. These flange sections may also act to produce an additional deflection directed transversely to the circumferential direction of the article 104. For this purpose, for example, an electrically insulating coating (not shown) may be applied to one flange section relative to the other flange section; said coating being fed with a deflecting voltage.

Figure 5:
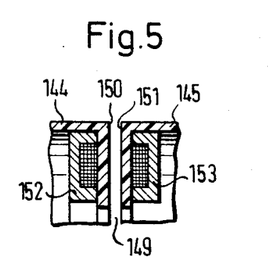
FIG. 5 is an enlargement of the region in FIG. 4 framed in a circle of broken lines of one embodiment.

An alternative embodiment of an additional deflecting device is shown in FIG. 5. Electromagnets 152 or 153 extending in circumferential direction are arranged on the flange sections 150, 151 made of nonmagnetisable material, and are able to cause an additionally controllable deflecting field in the slot 149. Such additional deflecting devices, for example, readily allow the beam to be periodically deflected at right angles to the direction of beam on entry into the irradiation chamber 147, so that the irradiated circumferential region of the article 104 is widened. Instead of the additional deflection at right angles to the direction of beam, the irradiated region may also be widened by fanning-out or defocusing the beam. It is thus expedient not to effect the fanning-out or defocusing until after passage through the deflecting devices, thus shortly before impingement of the beam on the article 104. Such a defocusing device located between the deflecting fields and the surface to be irradiated may be of similar construction as the additional deflecting device shown in FIG. 5. Often it will suffice to use a defocusing magnet extending along the slot 149.

Figure 6:
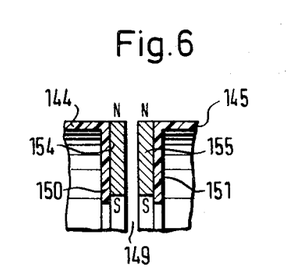
FIG. 6 is an enlargement of an alternative embodiment shown in the region framed in a circle of broken lines in an alternative modified embodiment.

In FIG. 6 an embodiment is shown in which the flange sections 150, 151 are each fitted with an annular focusing magnet 154 or 155. The defocusing magnets herein are made as permanent magnets which are magnetised in a radial direction. It is, of course, also possible to defocus the beam at a different place, for example, before entry into the deflecting devices, or to impart an additional deflecting movement thereto. This purpose may be served, for example, by the additional deflecting device 157 indicated in FIG. 3, which is located in the coupling member 107. The additional deflecting devices may also be operated in synchronism with the remaining deflecting devices; this is indicated in FIG. 3 by the additional control leads 157.

In FIGS. 3 and 4 some further devices are indicated. For the controlled progressive movement of the article 104 through the working chamber a feeding device is used. The latter device consists of rails 158, 159 which extend in longitudinal direction through the working chamber, a conveying frame 160 rolling over the rails and a driving element 161, for example in form of a chain or a cable which is set in motion by a driving motor 164 via rollers 162, 163. A self-synchronising motor may be used, for example, as driving motor 164, so that the advance movement of the article 104 may be readily synchronised with the deflecting control device.

Since the treatment of the surface with the charge carrier beam is carried out in any way in an evacuated working chamber, it is very expedient particularly when setting varnish layers, for the latter also to be applied in the working chamber. If a preparatory surface treatment which has to be carried out at reduced pressure or in a vacuum is expedient before the application of the varnish layers then this preparatory surface treatment is advantageously carried out in the evacuated working chamber in any required way. FIG. 4 indicates both devices for applying a varnish layer and devices for carrying out preparatory surface treatments. The following working cycle is explained as example. An article 104 is to be provided with a coat of varnish and the coat of varnish to be then set. The article 104 is introduced from the right into the apparatus shown in FIG. 4, for example, through a vacuum seal (not shown), and by means of the feed device moved to the left through the working chamber 101. During this operation the article 104 first passes a glow discharge electrode 165 adapted to the surface form of the article, extending over the whole circumference of the irradiation chamber 147. This electrode is mounted with the aid of insulators 166 and is connected to high potential via a lead 167 which is insulated and passed through the partition 145 and the wall of the working chamber 101. Hence with the reduced pressure prevailing in the irradiation chamber 147 there is created a cleansing glow discharge between the glow discharge tube 165 and the article 104 connected to earth potential. With progressive movement of the article 104 to the left, the surface regions cleansed by the glow discharge are carried past the slot 149. Thus, by means of the electron beam 106 the still uncoated surface of the article 104 can be irradiated in quite a similar manner as later on by the surface layer applied during setting. The synchronisation of the control of the beam with the feed movement of the article may also be carried out in the same manner as later on when treating the applied surface layer. Often it will suffice to carry out cleaning only by glow discharge or cleaning by irradiation with the electron beam 106.

During the further movement of the article 104 to the left, the surface regions carried past the slot 149 arrive at the operating range of a varnish application device 168 which, for example, may also be formed as an electrostatic varnishing device. After the article 104 during the first movement to the left has been carried completely past the varnish application device 168, the direction of movement of the feed device is reversed and the article undergoes a second movement but this time to the right and is again carried past the slot 149 whereby the applied varnish layer is set by renewed irradiation with the electron beam 106. It is, of course, also possible to carry out both passages in the same direction; in this case the article may also be moved towards the left out of the working chamber. The door 169 indicated schematically in FIG. 4 may possibly also be replaced by a vacuum seal. In any case, all the operations may be controlled by the main control device 125 so that the action occurs with the correct mutual association and with the given operating parameters required. The beam used for cleaning and the beam used for the treatment of the surface layer may thus be taken from the same beam source and by using the same deflecting devices be passed successively over predetermined regions of the surface of the article. The deflecting fields and, if required, also the beam parameters of the beam may be adjusted in dependence upon the shape of the surface to be cleaned during the cleaning process and in accordance with the cleaning effect required in the given irradiated region of the surface.

It is within the scope of the invention to also possibly arrange a plurality of beam generating systems spread over the circumference of the working chamber. However, owing to the great simplicity and the low costs, a single beam generator will be preferred in most cases.

The setting of the varnish layer by a charge carrier beam is known per se, so that detailed statements concerning the setting process are not necessary.

Alternative embodiments are possible without abandoning the scope of the invention.

What I claim is:

1. A method of treatment of surface layers of articles by irradiation with charge carrier beams in which an article to be treated is inserted in a working chamber maintained at reduced pressure and a charge carrier beam generated by a beam source is conducted only through free apertures into the working chamber and therein applied to the surface layer of said article to be treated, characterized by the feature that the beam is conducted successively through a plurality of independently controllable deflecting fields distributed at least over part of a circumference of the article and is deflected progressively by said fields to impinge on and scan the surface of said article in the form of a moving impact spot traveling over predetermined circumferential areas of the article, and further characterized in that at least one of the irradiation parameters including impact spot traveling velocity, charge carrier velocity, charge carrier flow rate, and beam cross-section is controlled by controlling said beam source, and said deflection fields according to a program determined in dependence upon the form of the surface to be treated and in accordance with the absorption of beam energy required in the momentarily irradiated area of the surface layer.

2. A method as claimed in claim 1, in which said controllable deflecting fields are controllable magnetic fields.

3. A method as claimed in claim 1, in which said charge carrier beam is additionally deflected at right angles to the circumferential direction of said article.

4. A method as claimed in claim 1, in which said charge carrier beam is progressively conducted within coherent circumferential regions of said article by varying only one of said deflecting fields in a circumferential direction.

5. A method as claimed in claim 1, in which said control of the irradiation parameter includes controlling said deflecting fields in timed variation in dependence upon the angle of incidence at which the beam impinges with the surface layer of said article, and in dependence upon the position of the irradiated area on said article, so that a predetermined, substantially constant energy quantity is absorbed from said beam per unit quantity of said surface layer of said article to be treated.

6. A method as claimed in claim 1, in which said control of the irradiation parameters includes controlling the beam parameters in dependence upon the angle of incidence at which the beam impinges on the surface layer of said article and in dependence upon the position of the irradiated area on said article so that a predetermined, substantially constant energy quantity is absorbed from said beam per unit quantity of surface layer of said article to be treated.

7. A method as claimed in claim 1, in which said control of the irradiation parameters includes controlling the beam parameters determining the penetrating ability of said beam so that there is obtained a predetermined distribution of the energy absorption from said beam over the depth of the surface layer of said article to be treated.

8. A method as claimed in claim 1, in which said beam comprises at least two beam components having various charge carrier velocities, the velocities and current intensities of said beam components being so chosen that the irradiated surface layer of said article in one depth region absorbs more beam energy than in other depth regions.

9. A method as claimed in claim 8, in which said beam components are produced by periodically controlling the beam parameters of a single beam source in timed succession and in which said deflecting fields are controlled in synchronism with the control of said beam parameters.

10. A method as claimed in claim 1, in which said charge carrier beam comprises electrons in the velocity range up to 100 kev.

11. A method as claimed in claim 1, in which a surface layer to be treated is applied to the article in the working chamber.

12. A method as claimed in claim 1, in which, before application of the surface layers, an article to be treated is inserted in the working chamber and is subjected therein to a preparatory surface treatment which requires a reduced pressure.

13. A method as claimed in claim 12, in which said preparatory surface treatment at least partly includes cleaning the surface of said article by glow discharge.

14. A method as claimed in claim 12, in which said preparatory surface treatment includes cleaning the surface of said article by irradiation with a charge carrier beam.

15. A method as claimed in claim 14, in which an article which has been inserted in said working chamber is moved past a charge carrier beam source in a first pass and is cleaned by irradiation with a first charge carrier beam, then, after a surface layer to be treated has been applied to said article, said article is moved past a charge carrier beam source in a second pass and is irradiated with a second charge carrier beam for treatment of the surface layer.

16. A method as claimed in claim 15, in which said first and said second charge carrier beams are derived from the same beam source and conducted by the same independently controllable deflecting fields successively over predetermined regions of the surface of said article, and in which said irradiation parameters of said first charge carrier beam are adjusted during said cleaning of said article in dependence upon the form of the surface to be cleaned and in accordance with the cleaning effect required in the momentarily irradiated area of said surface.

17. A method as claimed in claim 1, in which said charge carrier beam is controlled in an impulse-like manner.

18. A method as claimed in claim 1, in which the surface of said article is scanned by said charge carrier beam in one coordinate direction by the movement of said article relative to said beam source and in the other coordinate direction by deflecting said beam.

19. A method as claimed in claim 1, in which said charge carrier beam is periodically reciprocated as it progressively drifts over the surface of an article to be treated.

20. A method as claimed in claim 1, in which said charge carrier beam is spread before impinging the surface of an article to be treated.

21. A method as claimed in claim 1, in which the diameter of said charge carrier beam at the point of impact with the surface of said article is of an order of magnitude of 1 cm.

22. A method as claimed in claim 1, in which a plurality of charge carrier beams are caused to act on the surface of the article to be treated.

23. Apparatus for the treatment of surface layers of articles by irradiation with charge carrier beams, said apparatus comprising: an evacuable working chamber for receiving an article to be treated, a beam generating system for generating a charge carrier beam, a beam control device for optionally controlling at least one of the beam parameters including charge carrier velocity, charge flow rate and beam cross-section, said beam generating system being connected with the working chamber via an irradiation path extending only through free apertures into said working chamber and directing said beam toward said article to impinge thereon in the form of an impact spot, a first beam deflecting device for producing a controllable deflecting field in the region of the working chamber where said beam produced by said beam generating system enters the working chamber, at least one additional beam deflecting device located adjacent to said first deflecting device so that a deflected beam on leaving said first deflecting device is conducted through said additional deflecting device where it is, again deflected, a deflection control device connected to said deflecting devices for controlling the said deflecting devices, and a main control device connected to said deflection control device to control the position and movement of said impact spot of said beam on the surface of said article in dependence upon the shape of the surface to be treated and to deflect said beam progressively to move said impact spot over said surface to scan said surface along a predetermined path determined by the irradiation requirements and physical configuration of said article.

24. Apparatus as claimed in claim 23, in which said beam control device is controllable by the main control device in synchronism with said deflection control device according to a programme which, depending upon the irradiation requirements to be fulfilled in an article, predetermines a certain relationship between the setting of the deflection control devices determining the irradiation point and the irradiation conditions required at this point.

25. Apparatus as claimed in claim 23, in which a plurality of deflecting devices are so positioned in said working chamber that they are distributed about at least a part of the circumference of an article to be treated which has been inserted therein.

26. Apparatus as claimed in claim 25, in which each of said deflecting devices produces a deflection bending the beam in a plane.

27. Apparatus as claimed in claim 25, in which all of said deflecting devices are arranged to produce deflections of said beam in a common plane.

28. Apparatus as claimed in claim 23, in which said deflecting devices operate with controllable magnetic fields.

29. Apparatus as claimed in claim 23, in which said working chamber is divided by a partition which has a narrow gap for the passage of said charge carrier beam, into a deflecting chamber containing said deflecting devices, and an irradiation chamber containing an article to be treated, both said chambers being evacuatable individually and forming a pressure stage system.

30. Apparatus as claimed in claim 23, in which at least one additional deflecting device is provided to produce an additional deflection movement of said beam extending at right angles from the deflection caused by the deflecting fields of said deflecting devices.

31. Apparatus as claimed in claim 29, in which elements of an additional deflecting device are provided on both sides of said gap to produce an additional deflection movement of said beam extending at right angles from the deflection caused by the deflecting fields of said deflecting devices.

32. Apparatus as claimed in claim 23, in which a defocusing device is positioned between said deflecting devices and the surface of an article to be irradiated.

33. Apparatus as claimed in claim 23, in which a defocusing device is located between deflecting devices and the surface to be irradiated, said defocusing device being provided with a defocusing magnet extending along the gap of said partition.

34. Apparatus as claimed in claim 23, in which a plurality of beam generating systems are positioned around the circumference of said working chamber.

35. Apparatus as claimed in claim 23, in which feed devices are provided for the controlled progressive movement of an article to be treated through said working chamber.

36. Apparatus as claimed in claim 35, in which said feed devices are synchronised with said deflection control device.

37. Apparatus as claimed in claim 23, in which a device is provided in the working chamber for applying a surface layer to be treated on an article inserted in said working chamber.

38. Apparatus as claimed in claim 23, in which a device is provided for the preparatory surface cleaning of articles inserted in said working chamber.

39. An apparatus for treatment of surface layers of articles by irradiation with charge carrier beams which comprises:
 (a) an evacuable working chamber having an open aperture for receiving the article to be treated,
 (b) a charge carrier beam generator positioned to direct said beam through said aperture toward said article to impinge thereon in the form of an impact spot,
 (c) beam control means connected to said beam generator for selectively actuating said beam generator to control the parameters of said beam including charge carrier velocity, charge flow rate and beam cross section,
 (d) a first beam deflector for producing a beam deflecting field in said chamber in the region of said aperture to deflect said beam as it enters said chamber,
 (e) an additional beam deflector for producing a beam deflecting field adjacent the field of said first deflector to further deflect the beam deflected by the field of said first deflector,
 (f) deflector control means connected to said first deflector and to said additional deflector for actuating them to selectively and progressively vary the fields produced thereby to move said impact spot over the surface of said article, and
 (g) a main control means connected to said beam control means and to said deflector control means, said main control means being responsive to a program input thereto based on the irradiation requirements and physical configuration of said article to actuate said beam control means and said deflector control means to vary said beam parameters and said deflecting fields in concert to cause said beam to scan the surface of said article along a predetermined path in accordance with said program input.

References Cited

UNITED STATES PATENTS

| | | | |
|---|---|---|---|
| 2,741,704 | 4/1956 | Trump et al. | 250—49.5 TE |
| 2,785,313 | 3/1957 | Trump | 250—49.5 TE |
| 2,897,365 | 7/1959 | Dewey et al. | 250—49.5 TE |
| 2,968,723 | 1/1961 | Steigerwald | 117—93.3 X |
| 2,989,633 | 6/1961 | Wilson | 250—49.5 TE |
| 3,104,321 | 9/1963 | Smith | 250—49.5 TE |
| 3,234,044 | 2/1966 | Andes et al. | 117—93.3 X |
| 3,246,147 | 4/1966 | Skala | 250—49.5 TE |
| 3,293,587 | 12/1966 | Robinson | 117—93.3 X |
| 3,294,583 | 12/1966 | Fedows-Fedotowsky | 117—93.3 X |
| 3,360,398 | 12/1967 | Garibotti | 117—93.3 X |
| 3,379,803 | 4/1968 | Tittmann et al. | 118—49.1 X |
| 3,392,051 | 7/1968 | Caswell et al. | 117—93.31 X |

FOREIGN PATENTS

| | | | |
|---|---|---|---|
| 789,456 | 1/1958 | Great Britain | 250—49.5 TE |

OTHER REFERENCES

Skala: Western Electric Technical Digest No. 1, January 1966, p. 31.

ALFRED L. LEAVITT, Primary Examiner

J. H. NEWSOME, Assistant Examiner

U.S. Cl. X.R.

117—93.31; 118—49.1; 250—49.5 TE